(12) United States Patent
Nageswaram et al.

(10) Patent No.: US 8,819,549 B2
(45) Date of Patent: Aug. 26, 2014

(54) METHOD AND SYSTEM FOR MUTIDIMENSIONAL VIRTUAL ONLINE SUPPORT CENTER

(75) Inventors: Amar Nageswaram, Irving, TX (US);
Vijay Arumugam, Irving, TX (US);
Dinyar Kavouspour, Plano, TX (US);
Fari Ebrahimi, Basking Ridge, NJ (US);
Amit Singh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 869 days.

(21) Appl. No.: 12/560,079

(22) Filed: Sep. 15, 2009

(65) Prior Publication Data

US 2011/0066938 A1    Mar. 17, 2011

(51) Int. Cl.
*G06F 3/048*    (2013.01)
(52) U.S. Cl.
USPC .......................................................... 715/706

(58) Field of Classification Search
CPC .................................................... G06Q 10/107
USPC .......................................................... 715/706
See application file for complete search history.

(56) References Cited

U.S. PATENT DOCUMENTS

| 6,064,730 | A  | * | 5/2000 | Ginsberg ................. 379/265.09 |
| 6,449,357 | B1 | * | 9/2002 | Sashihara ................ 379/265.09 |
| 2007/0050716 | A1 | * | 3/2007 | Leahy et al. ................... 715/706 |
| 2010/0122182 | A1 | * | 5/2010 | Bromenshenkel et al. ... 715/745 |

* cited by examiner

*Primary Examiner* — Boris Pesin
*Assistant Examiner* — Angie Badawi

(57) ABSTRACT

A virtual service center is provided to a customer visiting the service provider website. The customer can take an avatar and proceed to collect a token number and wait for chat session service in a virtual lounge to partake in various interactive options. The number of the current serving number is displayed so that the customer knows the position in the queue. The waiting lounge can include a virtual kiosk to provide the customer with self service while waiting.

14 Claims, 7 Drawing Sheets

METHOD AND SYSTEM FOR MUTIDIMENSIONAL VIRTUAL ONLINE SUPPORT CENTER

BACKGROUND INFORMATION

Online and web based support tools are increasingly being used to provide technical/sales support for customers. Although chat based customer support systems are cost effective and economical, the customer experience can be poor. Typically chat initiation starts with a click of a button or link on the website and instructions are given the customer to enter name and other relevant information. When all the service agents are busy, the customer must wait for the customer service representative to join the chat. During this time, as there is no indication of when service can be expected, the customer must constantly monitor the chat window for the next available service representative. Neither the length of the queue of customers awaiting service nor customer's place in the queue is known. Also unknown is the number of active customer service representatives. The customer support system thus can create a poor customer experience, the lack of an option for the customer to obtain self-service.

An additional disadvantage is the lack of an option for the customer to engage in self-service and the possibility of obtaining satisfaction during the waiting interval. Moreover, the service provider loses an opportunity to sell services or provide service information to the customer during the waiting time.

Therefore, there is a need for an interactive, flexible and efficient online service support center that enhances overall customer experience while providing opportunities to disseminate information.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing customer service interactive communication are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to instant communication (or chat)-based applications, it is contemplated that exemplary embodiments have applicability to other equivalent applications.

Figure 1:
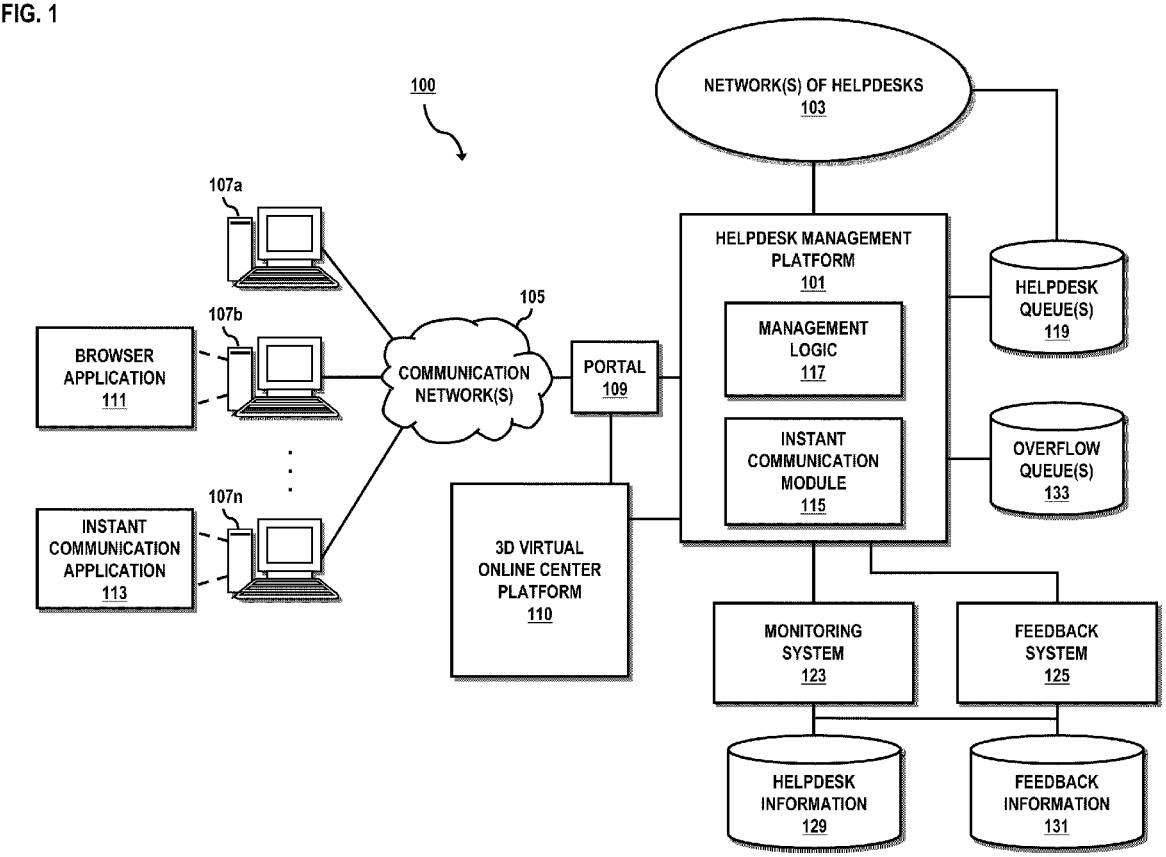
FIG. 1 is a diagram of a system capable of providing interactive customer service in which different modes of communications are available to a user, according to an exemplary embodiment.

FIG. 1 is a diagram of a system capable of providing managed instant communication (or chat)-based helpdesk services, according to an exemplary embodiment. For the purpose of illustration, system 100 is described with respect to helpdesk management (or customer support) platform 101 configured to manage, monitor, and operate one or more communication channels, e.g., instant communication, associated with one or more networks of helpdesks (or helpdesk networks) 103, as well as bridge particular ones of these helpdesks and users (e.g., customers, customer service agents, etc.) to these channels for providing instant communication-based customer support sessions over, for example, one or more communication networks 105. To this end, platform 101 is configured to enable service providers to publish, advertise, and update supported helpdesk services that, in turn, enables customers via one or more user devices 107a-107n to inquire about (or otherwise search for) desired customer support services. In exemplary embodiments, one or more portals 109 (e.g., websites, networked applications, application programming interfaces, etc.) may be provided to enable users to access the features and functionality of platform 101 via, for instance, browser applications (e.g., browser application 111). The portal 109 (e.g., online portal or web portal) permits access to a virtual online center platform 110, which can be displayed as a 3-dimensional (3-D) model view of a physical support center. In this manner, the user can essentially experience going to an actual brick and mortar facility in a virtual environment, which can make the user experience of waiting for service more palatable as in mimics a video game. In one embodiment, the user can create or select a character (or avatar) to enter this virtual support center. This avatar can be controlled to perform activities resembling that of the physical, real world, such as taking a number, and waiting in a waiting area. The waiting area can provide various activities, e.g., magazines and books, as well as television. This virtual support approach can supplement the convenience of the online experience, for instance, being able to communicate with service representatives via instant communications.

In certain embodiments, the 3D virtual online center platform 110 includes one or more computing devices configured to render 3D model views of a physical customer support center. The virtual online center platform 110 operates in conjunction with the helpdesk management platform 101 to represent customers within a virtual environment as the platform 101 provides the actual support services. In one embodiment, information about avatars and associated user preferences are stored within the center platform 110. Additionally, the 3D virtual online center platform 110 can maintain many renderings of different support centers, which vary in design (e.g., architecture, floorplan, interior design, etc.) depending on the particular service the users are seeking. In other words, the platform 101 can provide support services for various different services of a service provider; and thus, the virtual online center platform 110 can adapt to the particular service.

User devices 107a-107n may also be configured to execute instant communication (messaging or chat) applications (e.g., instant communication application 113) for communicating over communication network(s) 105 via the aforementioned instant communication channels. While specific reference will be made to the illustrated embodiment, it is contemplated that system 100 may embody many forms and include multiple and/or alternative components and facilities.

With the advent of data communications technologies, approaches, such as online self-service, email support, virtual chat and live chat, have been introduced into commerce. Although the various approaches provide advantages with respect to traditional telephony (e.g., toll free or 800/888) service, each may be limited for handling particular customer needs. Online self-service is often difficult for the user to navigate. The user may need to frame a specific question or request that may or may not eventually lead to resolution. Email support, which affords user contact with an agent, often incurs significant delays. Several interactive email reiterations may be required to obtain resolution. A customer who is seeking information for possible service may lose patience and a business opportunity may be lost. A virtual chat session, which has the appearance of current interaction with a live agent, may not adequately develop issues that lead to resolution.

Live chat sessions are perceived by customers as a more effective means of interactive communication. Such mode of communication provides cost benefits in comparison to voice interaction. Chat-based sessions (and supporting infrastructures) are significantly less expensive for both parties as compared to corresponding telephony-based services. If service agents are currently available, the customers can get quick access for effectively resolving their issues. Extension of chat-based customer support services through a managed helpdesk platform can provide an effective and efficient technique for creating a network of helpdesks that may be associated with one or more service provider agents and, thereby, made available to customers in a seamless manner.

As shown in FIG. 1, platform 101 is implemented as a backend data server accessible to one or more user devices 107a-107n via one or more middleware application servers, e.g., portal 109. User devices 107a-107n may interact with portal 109 via communication network(s) 105 utilizing, for example, browser application 111 to access the 3D virtual. Portal 109 may act as an enterprise web portal that provides a consistent "look and feel" for access control and helpdesk management operations. With such an architecture, user devices 107a-107n can be remotely dispersed (e.g., as by geography) from each other, as well as from platform 101, yet remain in collaboration with platform 101 via real-time access.

System 100 may include monitoring system 123 for monitoring helpdesks of helpdesk network 103 and/or helpdesk queues 119 associated therewith. For example, system 123 may monitor the number of instant communication sessions being received by the helpdesks of helpdesk network 103, the number of instant communication sessions being handled by customer service agents, the number of bridging operations performed in connection with the helpdesks and/or agents, helpdesk and agent wait times, and/or simultaneous instant communication sessions being supported by helpdesks and/or agents, as well as any other suitable parameter, such as one or more metrics (e.g., bandwidth, congestion, throughput, latency, etc.) associated with service level agreements corresponding to the customers and/or helpdesk service providers of system 100, or any parameter associated with helpdesk network 103, such as network topology, quality of service, total number of subscribers, etc. According to various embodiments, monitoring system 123 may communicate with platform 101 directly or via one or more networks, such as a corporate network (not illustrated) of the service provider of platform 101. Monitoring system 123 may store the aforementioned parameters, statistics, etc., in the form of helpdesk information to any suitable storage location or memory of (or accessible to) system 100, such as helpdesk information repository 129. To this end, monitoring system 123 may push (either automatically or in response to a request) certain helpdesk information to platform 101. A communication interface (not shown) may be utilized for transmitting helpdesk information to platform 101, either "on-demand" or as the result of a predefined schedule, such as continuously or periodically.

System 100 may include feedback system 125 configured to gather feedback information (e.g., ratings, open-ended customer responses, survey responses, etc.) corresponding to customer satisfaction with the managed instant communication (or chat)-based helpdesk services of system 100, as well as customer satisfaction with individual helpdesks and/or customer service agents associated therewith. System 125 may communicate with platform 101, and/or one or more third party sources (not shown), either directly or via one or more networks, such as a corporate network (not illustrated) of the service provider of platform 101. Feedback system 125 may store feedback information to any suitable storage location or memory or accessible to system 100, such as feedback information repository 131. System 125 may include a communication interface (not shown) for transmitting feedback information to platform 101, either "on-demand" or as the result of a predefined schedule, such as continuously or periodically.

Platform 101 is configured to facilitate managed instant communication (or chat)-based helpdesk services over one or more communication networks 105. Communication networks 105 may be any suitable wireline, wireless, or combination thereof network. For example, communication networks 105 may include one or more telephony networks, such as a circuit-switched network, e.g., the public switched telephone network (PSTN), an integrated services digital network (ISDN), a private branch exchange (PBX), or other like network. Communication networks 105 may employ various wireless access technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. In other instances, communication networks may include a data network, such as any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary cable or fiber-optic network. Communication networks 105 may include components and facilities to provide for signaling and/or bearer communications between the various components or facilities of system 100. In this manner, communication networks 107 may embody or include portions of a signaling system 7 (SS7) network, or other suitable infrastructure to support control and signaling functions.

In exemplary embodiments, user devices 107a-107n may include any customer premise equipment (CPE) capable of sending and/or receiving one or more forms of the aforementioned modes of communication (e.g., chat-based communications, electronic mail communications, facsimile communications, telephony communications, etc.), as well as send and receive information associated with one or more of the processes or features described herein. For instance, user devices 107a-107n may include functionality for telephony-based communications, such as those functions employed by suitable plain old telephone service (POTS) devices, facsimile machines, and the like. User devices 107a-107n may employ mobile (or otherwise wireless) functions, such as included in cellular phones, radiophones, satellite phones, smart phones, wireless phones, or any other suitable mobile device, such as personal digital assistants (PDA), pocket personal computers, tablets, customized hardware, etc. Further, user devices 107a-107n may include computing device functions, such as implemented by any suitable computing device, e.g., VoIP phones, skinny client control protocol (SCCP) phones, session initiation protocol (SIP) phones, IP phones, personal computers, softphones, workstations, terminals, servers, and the like.

User devices 107a-107n may include one or more components for extending instant communications sessions to users (e.g., instant communication applications 113), as well as include one or more browser applications (e.g., browser application 111) for accessing platform 101 and the features and functionalities thereof. Browser applications 111 and/or instant communication applications 113 (or any other suitable client program) may be executed via platform 101 (e.g., via instant communication module 115) and, thereby, made accessible to users via user devices 107a-107n. In this way, browser applications 111 and/or instant communication applications 113 may provide one or more user interfaces, e.g., graphical user interfaces (GUI), configured to interact with the various services (or functions) of system 100. Exemplary GUIs are described in more detail in accordance with FIGS. 4A-4C and 9A-9C. Additionally (or alternatively), these or other GUI interfaces may be configured to facilitate the acquisitioning, exchanging, managing, sharing, storing, and updating of service provider information, helpdesk information, and feedback information, respectively stored to, for example, helpdesk information repository 129, and feedback information repository 131. Such information may be stored to any suitable storage location or memory of (or accessible to system 100), such as memories (not shown) of platform 101, user devices 107a-107n, portal 109, monitoring system 123, feedback system 125, etc.

Repositories 129 and 131 may be configured for communication over system 100 (e.g., over one or more of communication networks 105) through any suitable messaging protocol, such as lightweight directory access protocol (LDAP), extensible markup language (XML), open database connectivity (ODBC), structured query language (SQL), Configuration Access Protocol (CAP) and the like, as well as combinations thereof. In those instances when repositories 129-131 are provided in a distributed fashions, information and content available via repositories 129-131 may be located utilizing any suitable querying technique, such as electronic number matching, distributed universal number discovery (DUNDi), uniform resource identifiers (URI), etc.

The term "platform" or "module" as used herein is intended to encompass the processing and communication hardware and software appropriate to perform the function required. Such elements may be incorporated into a single location or distributed. Platform or module elements may in part be dedicated to a particular mode or shared to support multiple modes of operation.

The advantages of chat based service systems such as illustrated in FIG. 1 have been described above. Conventionally, a customer would typically initiate a service request with a click of a button to link with the service website. The customer would then enter name and other relevant information and wait for the customer service representative to join the chat when all service agents are busy. During this time, as there is no indication of when service can be expected, the customer must constantly monitor the chat window for the next available service representative. The delay can often be substantial, trying the customer's patience. This unsatisfactory experience can lead the customer to terminate communication, resulting in loss to both the customer and the service provider. In recognition of these disadvantages, the virtual online center platform 110 is implemented as described with respect to FIGS. 2A-2C.

Figure 2A:
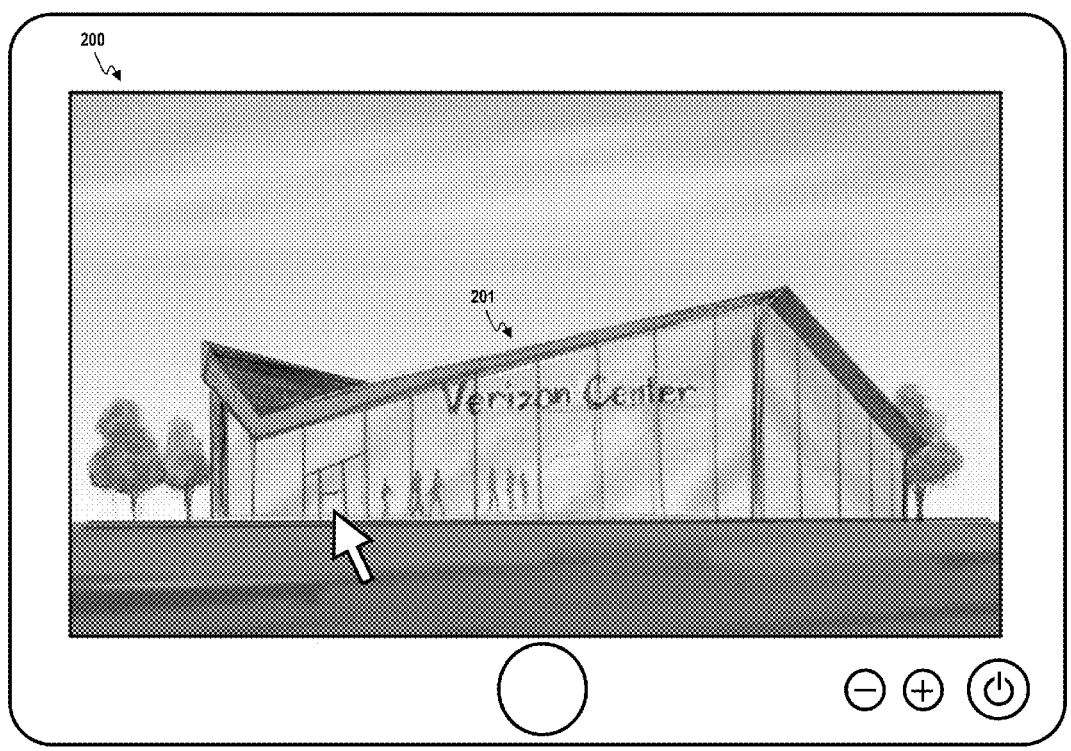
FIGS. 2A-2C are illustrations of a virtual service support center according to an exemplary embodiment.

As seen in FIG. 2A, a graphical user interface (GUI) 200 in which online technical and sales support is provided from a service support center with presentation to the customer of multidimensional views of a traditional brick and mortar support center. The displayed views of FIGS. 2A-2C, while shown as two dimensional depictions, are presented at the customer's display as three-dimensional scenes to provide a sense of presence within the service center. Generated data representing the virtual environment, for example, a service center building 201, are transmitted via portal 109 and network 105 to a customer 107a in response to a communication transmission received at the portal 109. The service center view, displayed at the customer screen, indicates that the customer has reached the virtual service center.

Figure 2B:
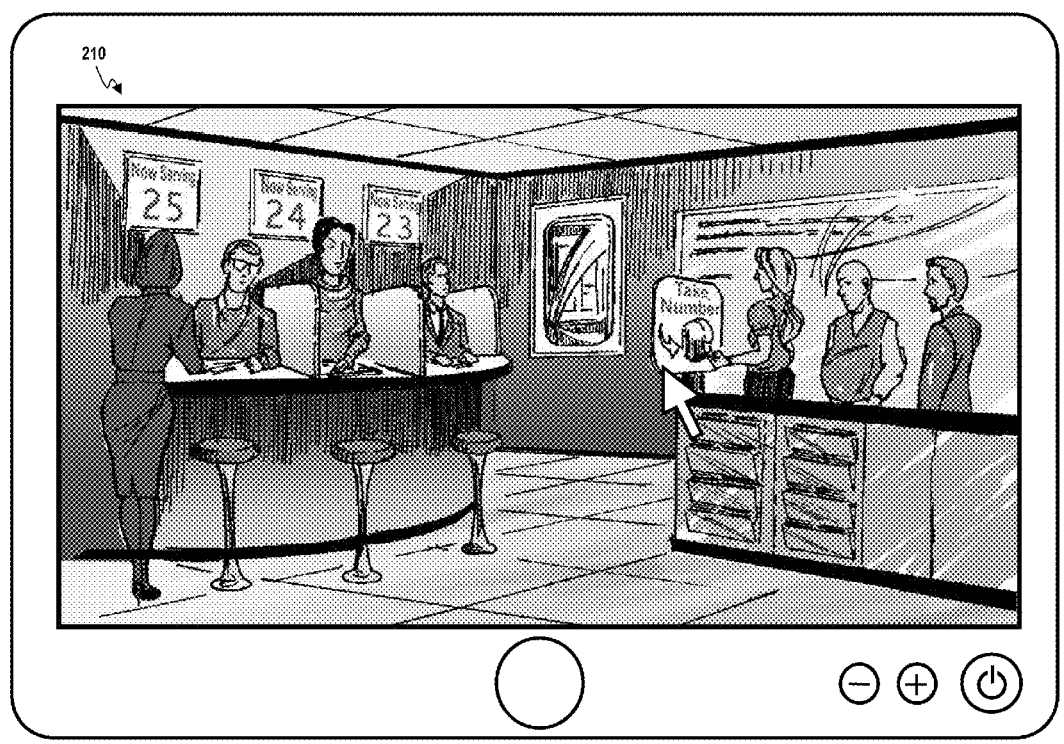
Figure 2C:
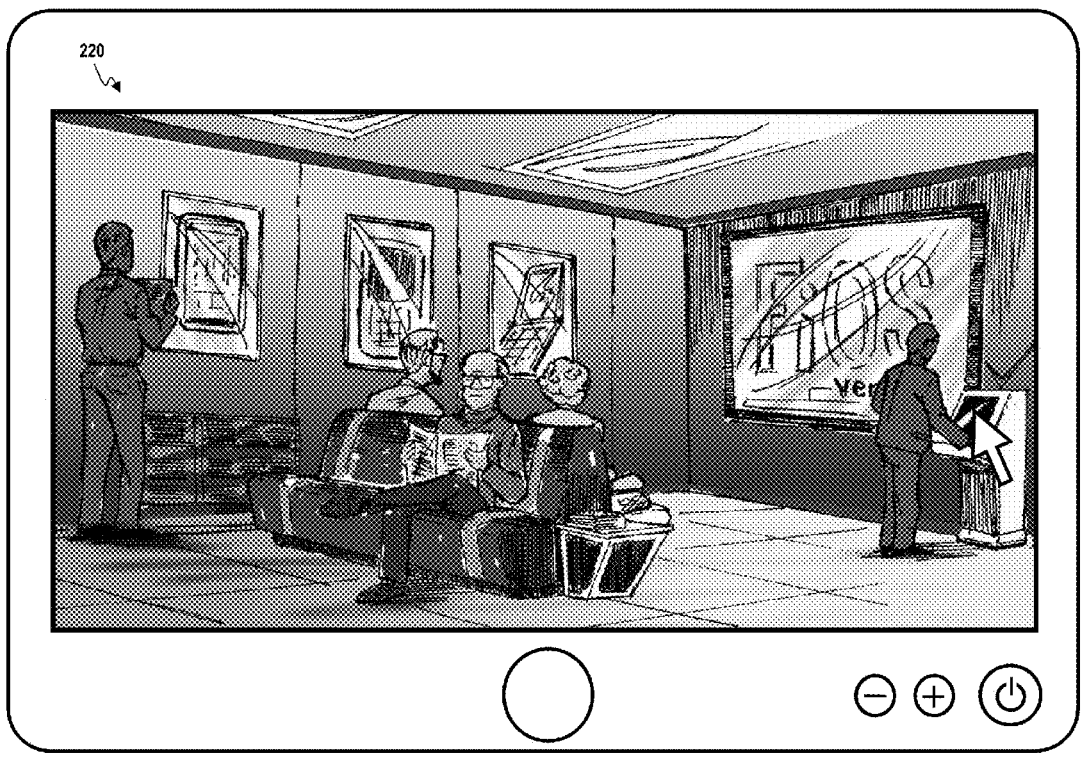

FIG. 2B illustrates a GUI 210 providing a multidimensional view of an entry portion of the service center. Depicted in this view are representations of service agents and customers who have arrived for service. The GUI 210 includes depiction of service number queues, which are updated in real time, and an option to the customer to "take a number" to enter a service queue. FIG. 2C provides a GUI 220 whereby a multidimensional view of a waiting lounge within the virtual service center is illustrated. The waiting lounge display data are presented to the customer and provide additional interactive options if no service representatives are currently available for chat sessions.

The illustrations of FIGS. 2B and 2C contain several images of personages that can function as avatars. An avatar is a computer user's self representation as an embodiment or alter ego. The avatars may be three-dimensional models or two-dimensional icons. Dynamic avatars may be implemented, for example, through Natural Language Processing (NLP) or Structured Language Processing (SLP) applications. Such known applications offer the user options and clearly defined paths to an outcome. Customers can explore the virtual universe of the service center through use of the avatars and conduct conversation with other users represented by other avatars in the waiting lounge.

By way of example, a customer accesses portal 109 (e.g., website) and is presented, via the virtual online center platform 110, with an option to create or select an avatar/persona that can resemble the user. The virtual environment can also permit the user to take a number token upon entry to the support center, proceed to the customer service representative, if available or wait in the lounge to browse latest magazines/books, chat/talk with other customers, walk to a service provider kiosk for possible self service or watch one of numerous television's planes displayed in the lounge. Provider products can be showcased or other programs presented. Once a customer service agent is available, an electronic display board can announce the current token number being served and the customer can proceed to the service agent for technical/sales support.

Figure 3A:
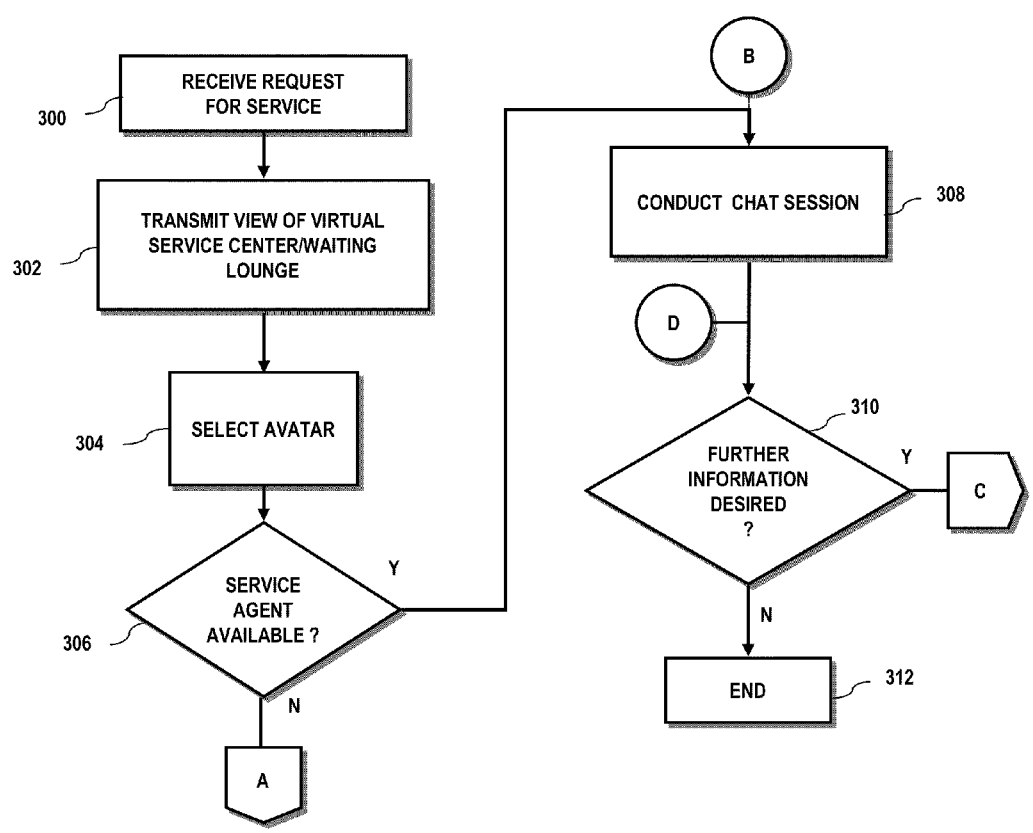
FIGS. 3A and 3B in combination is a flowchart of a process for operation for the virtual service support center according to an exemplary embodiment.
Figure 3B:
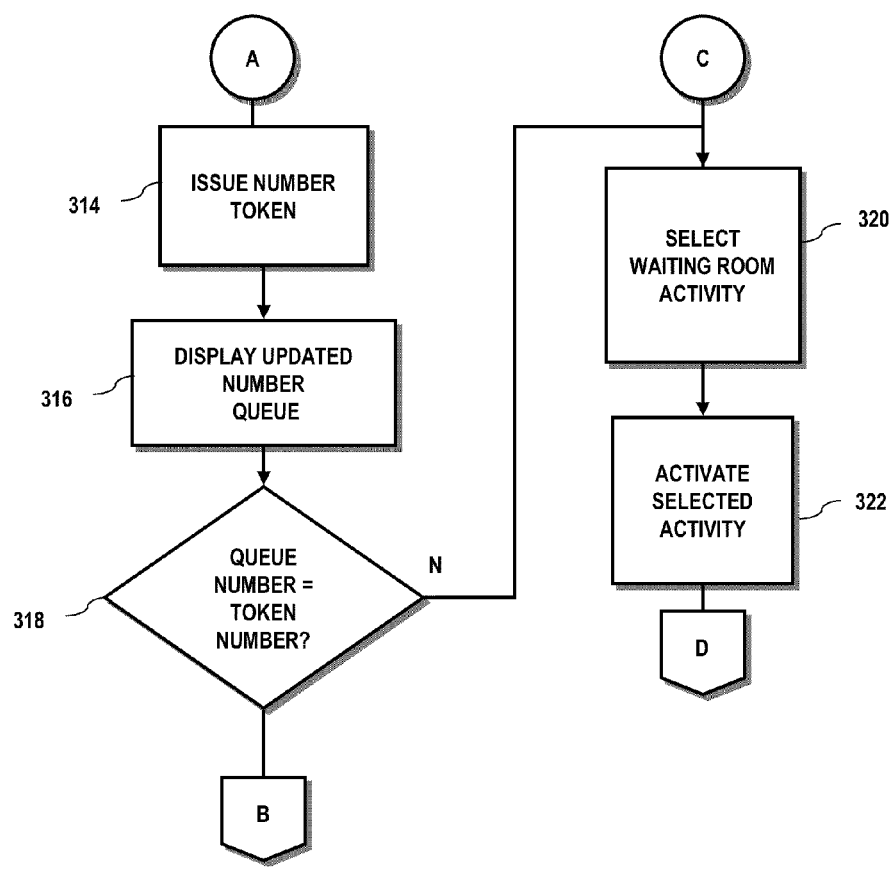

The flow chart shown in FIGS. 3A and 3B exemplify a process for operation of the virtual service center, according to certain embodiments. The process is under control of management logic module 117 at the helpdesk management platform 101 in conjunction with the virtual online center platform 110. In other words, the events and actions of this process are executed by the online center platform 110 in cooperation with the helpdesk management platform 101, such that the actions initiated by control of the avatar by the user triggers a corresponding process or action of the platform 101 and/or the center platform 110. At step 300, the helpdesk management platform 101 receives an incoming communication via portal 109 from, for example, station 107a. As this communication has arrived at the appropriate website address, the communication is recognized as a request for service or information from a customer. In response, data generated for views of the virtual service center, such as illustrated in FIGS. 2A-2C are transmitted to the customer at step 302. The view of FIG. 2A simulates arrival by the customer at the service center building location. Entry within the sales location, simulated by the view of FIG. 2B, provides the customer to select a displayed image as an avatar that represents the customer's persona.

At step 304, the customer selects an avatar to be directed to a displayed service representative, if available, to obtain service via chat session. Availability or non-availability of the service agents are on display. At step 306, determination is made as to whether a service representative is available. If so, the customer approaches, via avatar, the available service agent and a chat session is conducted at step 308. Upon conclusion of the chat session, if the customer is satisfied with the chat session and desires no further information, as determined in step 310, the process ends at step 312.

If it is determined at step 306 that no service agent is currently available, the customer may request a number to be placed in the service queue by avatar activation of the displayed number option. At step 314, a number token is issued that identifies the customer's place in the queue. Service queue numbers are displayed and updated at step 316. At step 318, determination is made as to whether the updated service queue number has reached the customer token number. If so, announcement of service availability is made and the process reverts to step 308, wherein chat session is initiated.

If determination has been made at step 318 that the queue has not reached the customer token number, the customer avatar can enter the waiting lounge, illustrated in FIG. 2C, to partake of the informational interactive options available therein. Step 318 will remain active to compare the service queue number with the customer token number until a match occurs. At that time service availability is announced. The process can then revert to step 308 to conduct the chat session with the agent. Among the various available options, the customer can browse latest magazines/books, chat/talk with other customers, walk to a service provider kiosk for possible self service or watch one of numerous TV's planes displayed in the lounge. The customer selects one of the options at step 320, the selected activity activated through the avatar at step 322.

Upon completion of the activity, if there has been no announcement of service agent availability at step 318, the process reverts to step 310. The customer may not desire further information at this time, as issues may have been resolved during an informational activity selected in step 320. The customer may choose to end communications, at step 312 without participating in a chat session with an agent. Alternatively, customer may choose to partake in another waiting room option at step 320.

The above arrangement, according to certain embodiments, advantageously provides a flexible and efficient method for interacting in support of customer assistance, thus dramatically enhancing the overall customer experience and in the process provide various opportunities to disseminate information.

One of ordinary skill in the art would recognize that the processes described above may be implemented via software, hardware (e.g., general processor, Digital Signal Processing (DSP) chip, an Application Specific Integrated Circuit (ASIC), Field Programmable Gate Arrays (Fogs), etc.), firmware, or a combination thereof. Such exemplary hardware for performing the described functions is detailed below.

Figure 4:
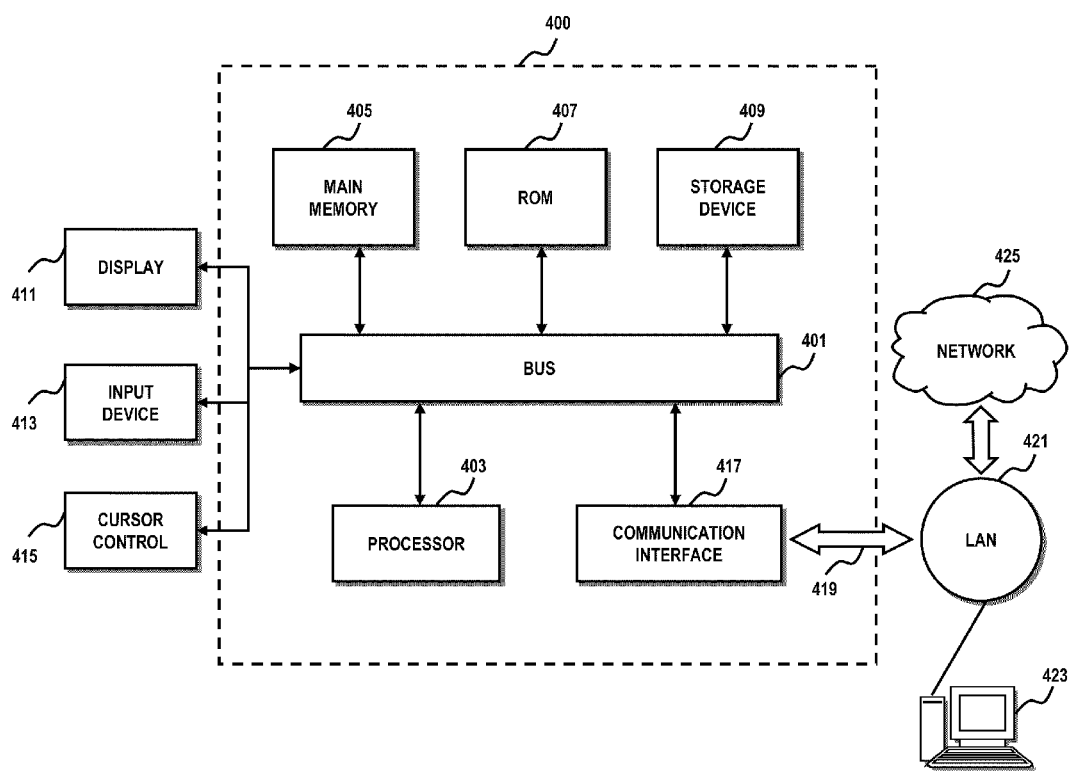
FIG. 4 is a diagram of a computer system that can be used to implement various exemplary embodiments.

FIG. 4 illustrates computing hardware (e.g., computer system) upon which an embodiment, such as one of the stations 107a-107n, portal 109, or platforms 101, 110, according to the invention can be implemented. Such computing hardware is also applicable to the service center apparatus. The computer system 400 includes a bus 401 or other communication mechanism for communicating information and a processor 403 coupled to the bus 401 for processing information. The computer system 400 also includes main memory 405, such as random access memory (RAM) or other dynamic storage device, coupled to the bus 401 for storing information and instructions to be executed by the processor 403. Main memory 405 also can be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to an embodiment of the invention, the processes described herein are performed by the computer system 400, in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the invention. Thus, embodiments of the invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g.

for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

The computer system 400 can send messages and receive data, including program code, through the network(s), the network link 419, and the communication interface 417. In the Internet example, a server (not shown) might transmit requested code belonging to an application program for implementing an embodiment of the invention through the network 425, the local network 421 and the communication interface 417. The processor 403 may execute the transmitted code while being received and/or store the code in the storage device 409, or other non-volatile storage for later execution. In this manner, the computer system 400 may obtain application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as the storage device 409. Volatile media include dynamic memory, such as main memory 405. Transmission media include coaxial cables, copper wire and fiber optics, including the wires that comprise the bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving, at an online website, a data communication from a remote customer;
    in response to the data communication, generating data representing a multidimensional view of a service support center and transmitting the generated data to the remote customer;
    generating a display of a virtual waiting lounge, the virtual waiting lounge display including images representing respective user options for the remote customer while awaiting chat session service,
    providing an option to the remote customer to select an avatar representing the persona of the remote customer from the virtual waiting lounge for interactive communication between the remote customer and the website,
    wherein the interactive communication comprises an automated chat session with a website representative, and
    wherein the user options include viewing a magazine or book.

2. The method of claim 1, further comprising establishing the chat when a website representative is available.

3. The method of claim 2, wherein the step of establishing comprises selecting an image associated with the website representative in the displayed view.

4. The method of claim 2, further comprising:
    issuing a number token to the remote customer when a website representative is not currently available; and
    inserting a display board in the generated view that indicates a current service number.

5. The method of claim 4, further comprising updating the display board number indication as customer service advances.

6. The method of claim 4, further comprising:
    providing interactive chat session availability for communication among customers entered in the support center who are awaiting service.

7. The method of claim 1, wherein the virtual waiting lounge display further includes a virtual kiosk selectable by the remote customer to initiate online self-service.

8. An apparatus comprising:
    a processor configured to generate data representing a multidimensional view of a service support center in response to a request from a customer; and
    a communication interface configured to transmit the generated data to the customer via the interface after the data is generated, wherein the processor is further configured:
to generate a display of a virtual waiting lounge, the virtual waiting lounge display comprising images representing respective user options for the customer while awaiting chat session service; and
to provide an option to the customer to select an avatar representing the persona of the customer from the virtual waiting lounge for interactive communication between the customer and the website,
wherein the interactive communication comprises an automated chat session with a website representative, and
wherein the user options include viewing a magazine or book.

9. The apparatus of claim 8, wherein the processor is further configured to initiate establishment of the chat session when a website representative is available.

10. The apparatus of claim 9, wherein the chat session is established in response to selection by the customer of an image associated with the website representative in the displayed view.

11. The apparatus of claim 9, wherein the processor is further configured to:
initiate transmission of a number token to the customer if a website representative is not currently available; and
add a display board in the generated view that indicates a current service number.

12. The apparatus of claim 11, wherein the display board number indication is updated as customer service advances.

13. The apparatus of claim 9, wherein the processor is further configured to provide interactive chat session availability for communication among customers entered in the support center who are awaiting service.

14. The apparatus of claim 8, wherein the virtual waiting lounge display comprises a virtual kiosk selectable by the customer to initiate online self-service.

* * * * *